(12) United States Patent
Carroll et al.

(10) Patent No.: US 8,087,686 B1
(45) Date of Patent: Jan. 3, 2012

(54) BICYCLE DROP OUT ASSEMBLY

(76) Inventors: Ryan Michael Carroll, Arvada, CO (US); Jason MacNeil, Vancouver (CA)

( * ) Notice: Subject to any disclaimer, the term of this patent is extended or adjusted under 35 U.S.C. 154(b) by 0 days.

(21) Appl. No.: 12/871,960

(22) Filed: Aug. 31, 2010

(51) Int. Cl.
 *B62K 19/30* (2006.01)
(52) U.S. Cl. ...... 280/288; 280/284; 280/274; 280/281.1
(58) Field of Classification Search ............... 280/288, 280/284, 274, 281.1; 301/110.5, 124.2
 See application file for complete search history.

(56) References Cited

U.S. PATENT DOCUMENTS

| | | | | |
|---|---|---|---|---|
| 570,327 | A * | 10/1896 | Naregang | 474/116 |
| 654,182 | A * | 7/1900 | Rupsch | 280/288 |
| 4,634,139 | A * | 1/1987 | Watanabe et al. | 280/288 |
| 5,058,913 | A * | 10/1991 | La Riviere et al. | 280/281.1 |
| RE34,009 | E * | 7/1992 | Schilplin | 280/288 |
| 6,554,307 | B1 * | 4/2003 | Ockenden | 280/204 |
| 7,854,441 | B2 * | 12/2010 | Scurlock | 280/261 |
| 7,918,474 | B2 * | 4/2011 | Waxham | 280/288 |
| 7,934,739 | B2 * | 5/2011 | Domahidy | 280/284 |
| 2007/0257467 | A1 * | 11/2007 | Chuang | 280/292 |
| 2008/0156565 | A1 * | 7/2008 | Aoki | 180/227 |
| 2011/0042917 | A1 * | 2/2011 | Cleveland | 280/288 |

* cited by examiner

*Primary Examiner* — Paul N Dickson
*Assistant Examiner* — Tashiana Adams

(57) ABSTRACT

An improved bicycle rear drop out assembly combined with a flexible power transmission means, such as a chain or belt. The assembly consists of plates allowing installation through the bicycle's support frame stays and tensioning of the flexible power transmission device. When fastening the plates together the receiving gap the belt was installed in is closed and concurrently the plates are secured in the desired location for optimal operation of a belt drive system to power the wheel.

20 Claims, 5 Drawing Sheets

US 8,087,686 B1

BICYCLE DROP OUT ASSEMBLY

FIELD OF THE INVENTION

The present invention relates generally to the manufacture and use of bicycle rear forks and more particularly to a rear dropout assembly for ease of fabrication and a unified fastening feature for allowing a gap for installation of a belt through the frame and then securing the gap and wheel axle plate location.

BACKGROUND OF THE INVENTION

Traditional bicycle frames have a drive system with a forward sprocket and rear sprocket. The forward sprocket is typically connected a crank arm and rear sprocket is connected to the rear wheel hub assembly. The forward sprocket and rear sprocket connected by a chain to transfer the riders pedaling to rear wheel rotation.

Traditional bicycle frames have been crafted to be stronger and lighter and stiffer in the rear fork to allow for stable control and full power transfer from rider pedaling without flexing. It is then necessary for power transmission device to be separable which is why a chain with a master link or master pin is traditionally used to allow opening or 'breaking' the continuous loop of the chain for installation through the bicycle frame's rear forks. Then closing the loop of the chain again once installed around the front and rear sprockets.

In recent years, continuous belts have proven to be more efficient, have a longer wear life and much lighter weight than the traditional chain used.

To facilitate the use of a continuous belt initial attempts to craft rear fork structures with releasable openings have been made. These openings create breaks in the rear fork structure that create added bolts and added fabrication measures during manufacture to hold in place for alignment. To retain the stiffness of the rear fork structure additional parts must be used to create a solid closing thus increasing weight.

Thus, there exists a need in the art for a bicycle rear fork drop out with a releasable opening for installation of a continuous belt that allows easy fabrication and use. The present invention intends to provide an improved method to achieve this.

SUMMARY OF THE INVENTION

In accordance with a preferred embodiment of the present invention, there is provided a wheel attachment apparatus for the rear fork of a bicycle that provides installation and tension adjustment for a flexible continuous belt.

A vertical first stay plate having an inside face and outside face forward tab for means of attaching to rear upper stay tube of rear fork. A vertical second stay plate having an inside and outside face and forward tab for means of attaching to rear lower stay tube of the rear fork. A vertical drop out plate for receiving a wheel hub axle having inside and outside faces. The three plates are arranged with any one of the plates disposed in between the other two said plates. By using the means for connection that traverses said three plate arrangement a fixturing spacer can be secured between the right and left sides drop outs to hold the right and left sides in exact alignment as such rear fork ends are then typically welded or soldered into the rear of the bicycle frame.

When the means for securing the three plates is released, this arrangement of the three plates allows for a receiving gap to be achieved by separating as need said first stay plate and second stay plate facing faces thus allowing the installation of a continuous belt thought the receiving gap.

Once the belt is installed onto the front and rear sprockets the three plates can be secured again, closing the receiving gap and solidifying the rear drop out. Upon securing the three plates the wheel receiving drop out is also secured in place creating a set location to attain tension on the installed belt between the forward and rearward sprockets.

It is an object of the present invention to provide a bicycle rear fork drop out with a releasable opening for installation of a continuous belt that allows easy fabrication and use.

It is another object of the present invention to provide a simple securing method that of drop out plates that also facilitates ease of fabrication and alignment for welding or soldering or other means of connection available to ones skilled in the art of bicycle fabrication.

Other objects, advantages, and novel features of the invention will become more apparent from the following detailed description when taken in conjunction with the accompanying drawings.

BRIEF DESCRIPTION OF THE DRAWINGS

These as well as other features of the present invention will become apparent upon reference to the drawings wherein.

DETAILED DESCRIPTION OF THE PREFERRED EMBODIMENT

Figure 1:
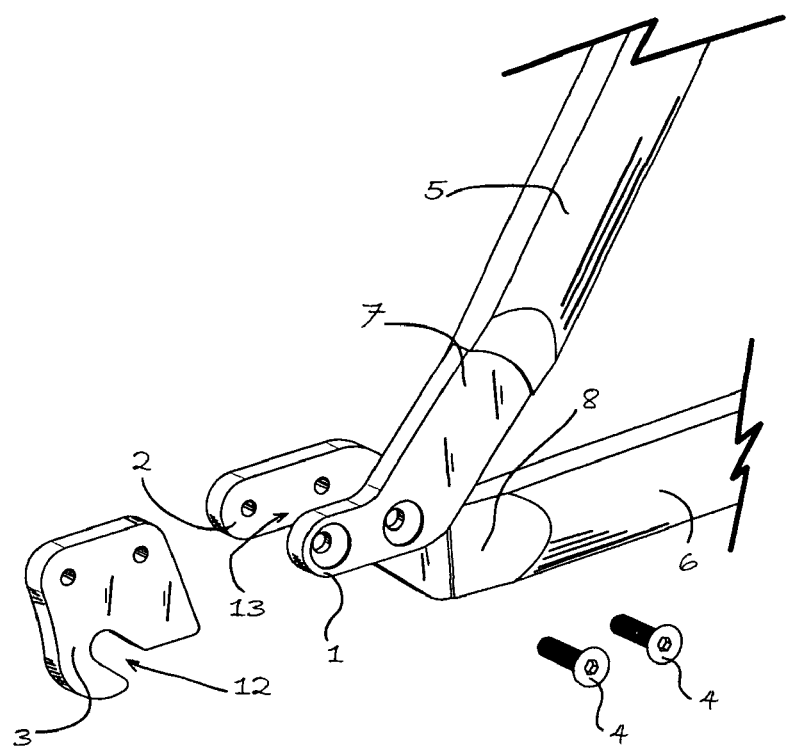
FIG. 1 is a perspective view of the drop out assembly.
Figure 2:
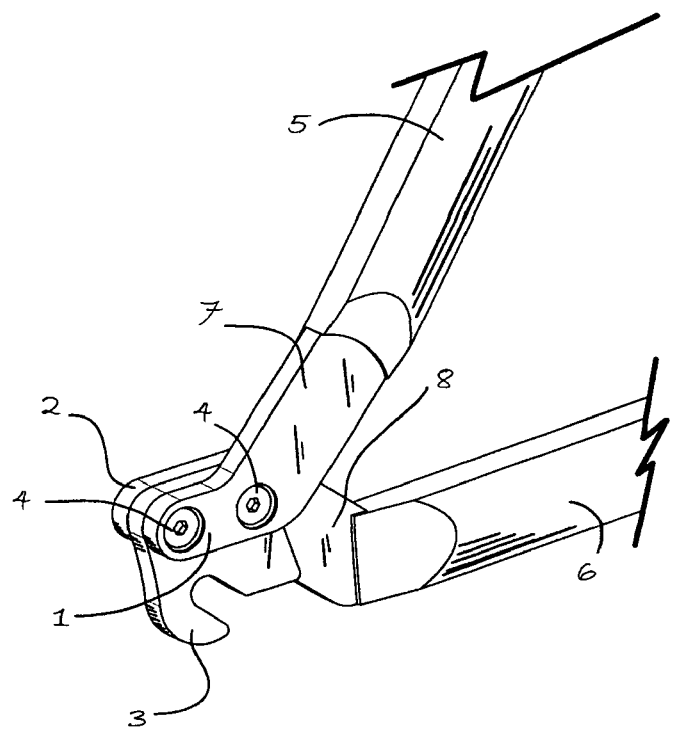
FIG. 2 is a perspective view of the drop out assembly.
Figure 3:
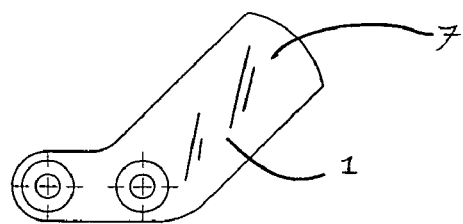
FIG. 3 is a side view of the seat stay plate.
Figure 4:
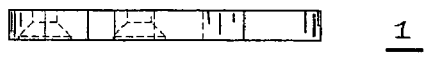
FIG. 4 is a top view of the seat stay plate.
Figure 5:
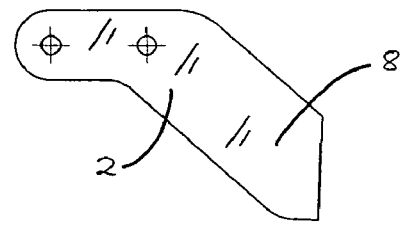
FIG. 5 is a side view of the chain stay plate.
Figure 6:
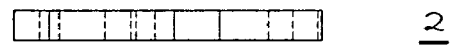
FIG. 6 is a top view of the chain stay plate.
Figure 7:
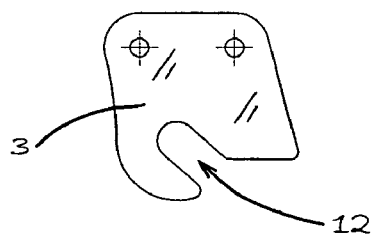
FIG. 7 is a side view of the drop out plate.
Figure 8:
FIG. 8 is a top view of the drop out plate.
Figure 9:
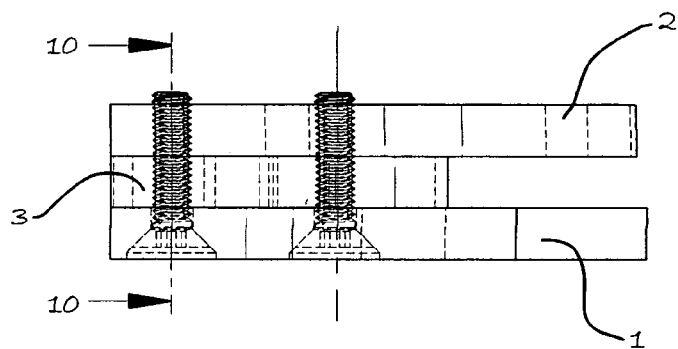
FIG. 9 is a top view of the drop out assembly.
Figure 10:
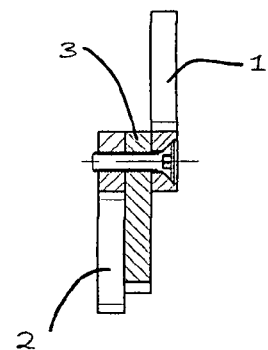
FIG. 10 is a cross section through FIG. 9
Figure 11:
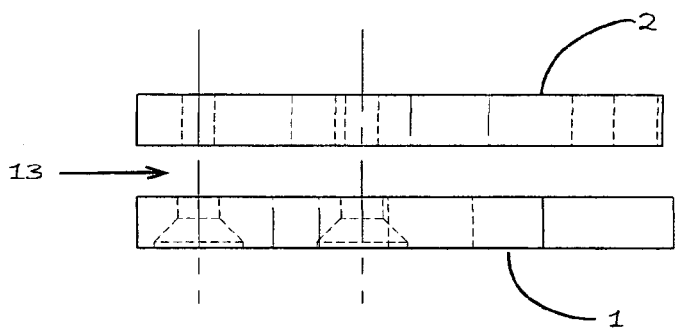
FIG. 11 is a top view of receiving gap.

Referring now to the drawing wherein the showings are for purposes of illustrating a preferred embodiment of the present invention only and not for the purposes of limiting the same, FIG. 1 perceptively illustrates the drop out assembly. The drop out assembly, seen in FIG. 1, comprises seat stay plate 1, chain stay plate 2 and drop out plate 3. Threaded fasteners 4 traverse through seat stay plate 1 and drop out plate 3, and thread into chain stay plate2 to secure the three plate assembly as additionally illustrated in FIG. 10. Shown in FIG. 1, seat stay plate 1 is connected to seat stay member 5 and chain stay plate 2 is connected to chain stay member 6 of the bicycle frame.

To facilitate the engagement of seat stay plate 1 and chain stay plate2 to a bicycle frame seat stay member 5 and chain stay member 6, seat stay plate 1 includes an attachment portion or tab 7 and chain stay plate 2 includes an attachment portion or tab 8. In this regard, a frictional connection method know in the art can be used between tab 7 and seat stay member 5. Likewise a frictional connection method is used between tab 8 and chain stay member 6.

Disposed within drop out plate 3 is a vertically oriented, elongated wheel axle slot 12. Wheel axle slot is defined by an opening that raises upward to a closing end face therein.

With the seat stay plate 1 and chain stay plate 2 frictionally connected to the bicycle frame stays members, threaded fasteners 4 can be unsecured and removed allowing drop out plate 3 to be disengaged to create gap 13. A belt (not shown) can be installed into the bicycle frame by being passed through gap 13.

Figure 12:
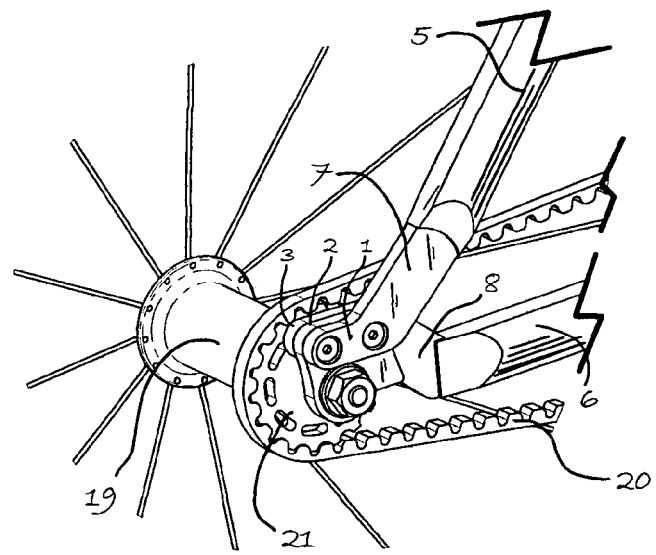
FIG. 12 is a perspective view of drop out assembly with wheel and belt.
Figure 13:
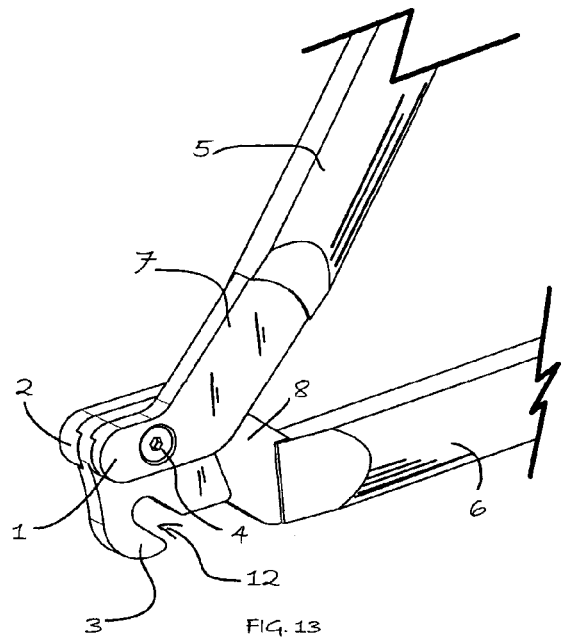
FIG. 13 is a perspective view of alternate drop out assembly.
Figure 14:
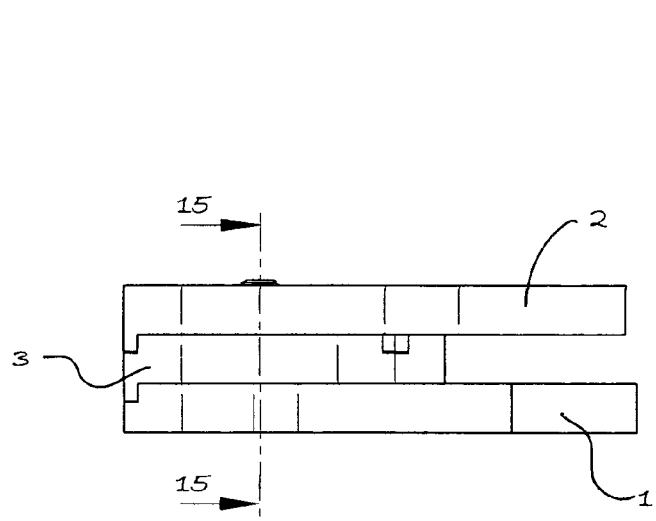
FIG. 14 is a top view of alternate drop out assembly.
Figure 15:
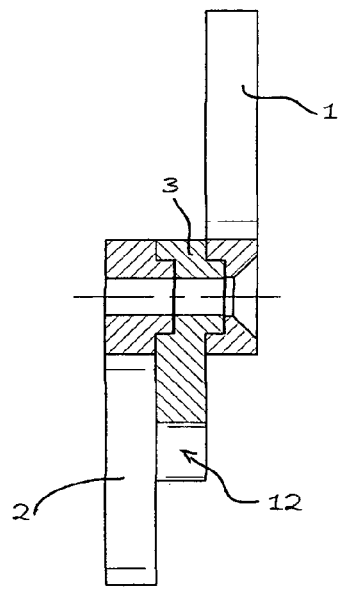
FIG. 15 is a cross section view through FIG. 13.
Figure 16:
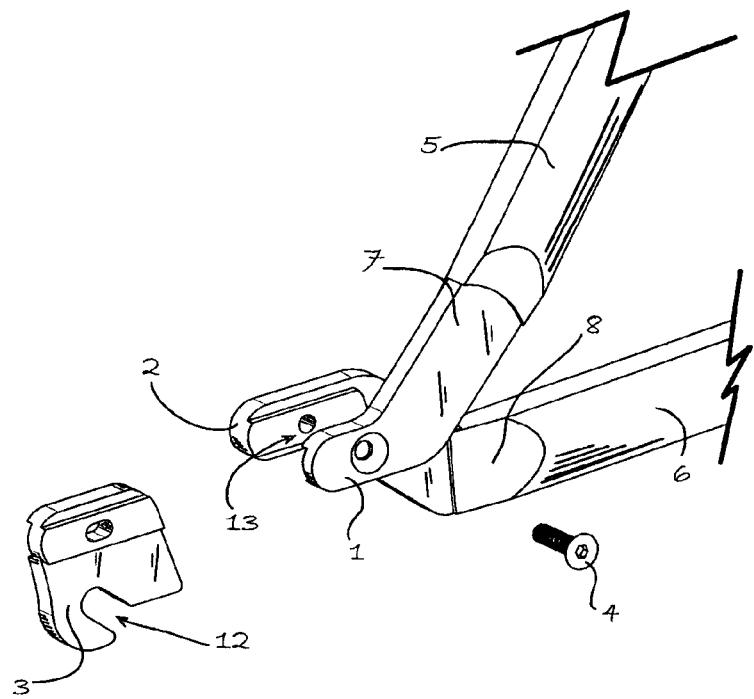
FIG. 16 is a perspective view of alternate drop out assembly.
Figure 17:
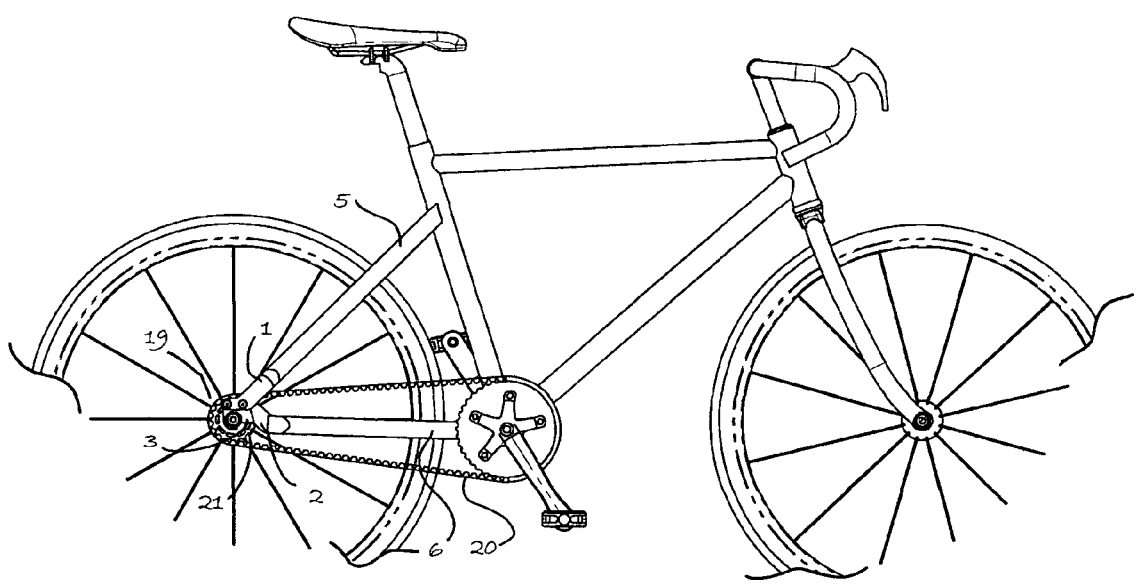
FIG. 17 is a side view of bicycle frame.

As seen in FIG. 12, once the belt 20 has passed into the frame, the drop out assembly can be secured again with threaded fasteners 4. A rear sprocket 21 mounted axial on the wheel hub 19 is secured in place by the wheel hub axle in wheel axle slot 12. Belt 20 engages rear sprocket 21.

The foregoing description is considered as illustrative only of the principles of the invention. Furthermore, since numerous modifications and changes will readily occur to those skilled in the art, it is not desired to limit the invention to the exact construction as described above. Accordingly, all suitable modifications and equivalents may be resorted to falling within the scope of the invention as defined by the claims which follow.

What is claimed:

1. A bicycle rear drop out assembly that provides installation and tension adjusting for a flexible power transmission means, said bicycle wheel attachment apparatus comprising;
   a vertical first stay plate having an inside face and outside face;
   a vertical second stay plate having an inside face and outside face;
   a vertical drop out plate for receiving a wheel hub axle having an inside face and outside face;
   said three plates are arranged with any one of the plates disposed in between the other two said plates, the middle plate's inside and outside facing the adjacent face of the now inner and outer plates;
   within said three plate arrangement, a receiving gap is achieved by separating as needed said first stay and said second stay and allowing said power transmission means to pass through for installation;
   means for connection that traverses said three plate arrangement, said means for connection there upon being secured, closes
   said receiving gap and locks said drop out plate location, creating a means for tensioning said flexible power transmission means as desired for system operation.

2. The bicycle rear drop out assembly as in claim 1, wherein a common known wheel axle tensioning device that locate the drop out plate in position for proper in use tension of said flexible transmission means before securing said means of connection together of said three plate arrangement.

3. The bicycle rear drop out assembly as in claim 1, wherein the first plate and second plate are disposed of within a rear swing arm.

4. The bicycle rear drop out assembly as in claim 1, wherein the first plate and second plate are disposed of on the right side of the bicycle.

5. The bicycle rear drop out assembly as in claim 1, wherein the first plate and second plate are disposed of on the left side of the bicycle.

6. The bicycle rear drop out assembly as in claim 1, wherein the three plate arrangement, the middle plate comprising a first member for engaging the first receiving portion of the outer plate and the inner plate comprising a first member for engaging the first receiving portion of the middle plate.

7. The bicycle rear drop out assembly as in claim 1, wherein the three plate arrangement, the middle plate comprising a first member for engaging the first receiving portion of the inner plate and the outer plate comprising a first member for engaging the first receiving portion of the middle plate.

8. The bicycle rear drop out assembly as in claim 1, wherein the three plate arrangement, the drop out plate comprising a slots for tension adjustment.

9. The bicycle rear drop out assembly as in claim 1, wherein the three plate arrangement, the seat stay plate and chain stay plate have disposed within slots for tension adjustment.

10. The bicycle rear drop out assembly as in claim 1, wherein the three plate arrangement, a minimum of at least one face of drop out plate and adjacent plate face contact at a tapered angle that upon securing connection, force wedge to pushing drop out plate with wheel hub axle into tension.

11. A bicycle rear drop out assembly wheel attachment apparatus that provides installation and tension adjusting for a flexible power transmission means, said bicycle wheel attachment apparatus comprising;
    a vertical first stay plate having an inside face and outside face;
    a vertical second stay plate having an inside face and outside face;
    a vertical drop out plate for receiving a wheel hub axle having an inside face and outside face;
    a drive system comprising a first forward sprocket and a second sprocket axially mount on the wheel hub axle;
    a flexible transmission means for engagement between said first sprocket and said second sprocket;
    said plates are arranged with any one of the plates disposed in between the other two said plates, the middle plate's inside and outside facing the adjacent face of the now inner and outer plates;
    within said three plate arrangement, a receiving gap is achieved by separating as needed said first stay and said second stay and allowing said power transmission means to pass through for installation;
    means for connection that traverses said three plate arrangement, said means for connection there upon being secured, closes said receiving gap and locks said drop out plate location, creating a means for tensioning said flexible power transmission means when engaged between said first sprocket and second sprocket.

12. The bicycle rear drop out assembly as in claim 11, wherein a common known wheel axle tensioning device that locate the drop out plate in position for proper in use tension of said flexible transmission means before securing said means of connection togegther of said three plate arrangement.

13. The bicycle rear drop out assembly as in claim 11, wherein the first plate and second plate are disposed of within a rear swing arm.

14. The bicycle rear drop out assembly as in claim 11, wherein the first plate and second plate are disposed of on the right side of the vehicle.

15. The bicycle rear drop out assembly as in claim 11, wherein the first plate and second plate are disposed of on the left side of the vehicle.

16. The bicycle rear drop out assembly as in claim 11, wherein the three plate arrangement, the middle plate comprising a first member for engaging the first receiving portion of the outer plate and the inner plate comprising a first member for engaging the first receiving portion of the middle plate.

17. The bicycle rear drop out assembly as in claim 11, wherein the three plate arrangement, the middle plate comprising a first member for engaging the first receiving portion of the inner plate and the outer plate comprising a first member for engaging the first receiving portion of the middle plate.

18. The bicycle rear drop out assembly as in claim 11, wherein the three plate arrangement, the drop out plate comprising a slots for tension adjustment.

19. The bicycle rear drop out assembly as in claim 11, wherein the three plate arrangement, the seat stay plate and chain stay plate have disposed within slots for tension adjustment.

20. The bicycle rear drop out assembly as in claim 11, wherein the three plate arrangement, a minimum of at least one face of drop out plate and adjacent plate face contact at a tapered angle that upon securing connection, force wedge to pushing drop out plate with wheel hub axle into tension.

* * * * *